(No Model.) 2 Sheets—Sheet 2.
R. MANNESMANN.
METHOD OF AND APPARATUS FOR CONVEYING WATER.
No. 549,243. Patented Nov. 5, 1895.
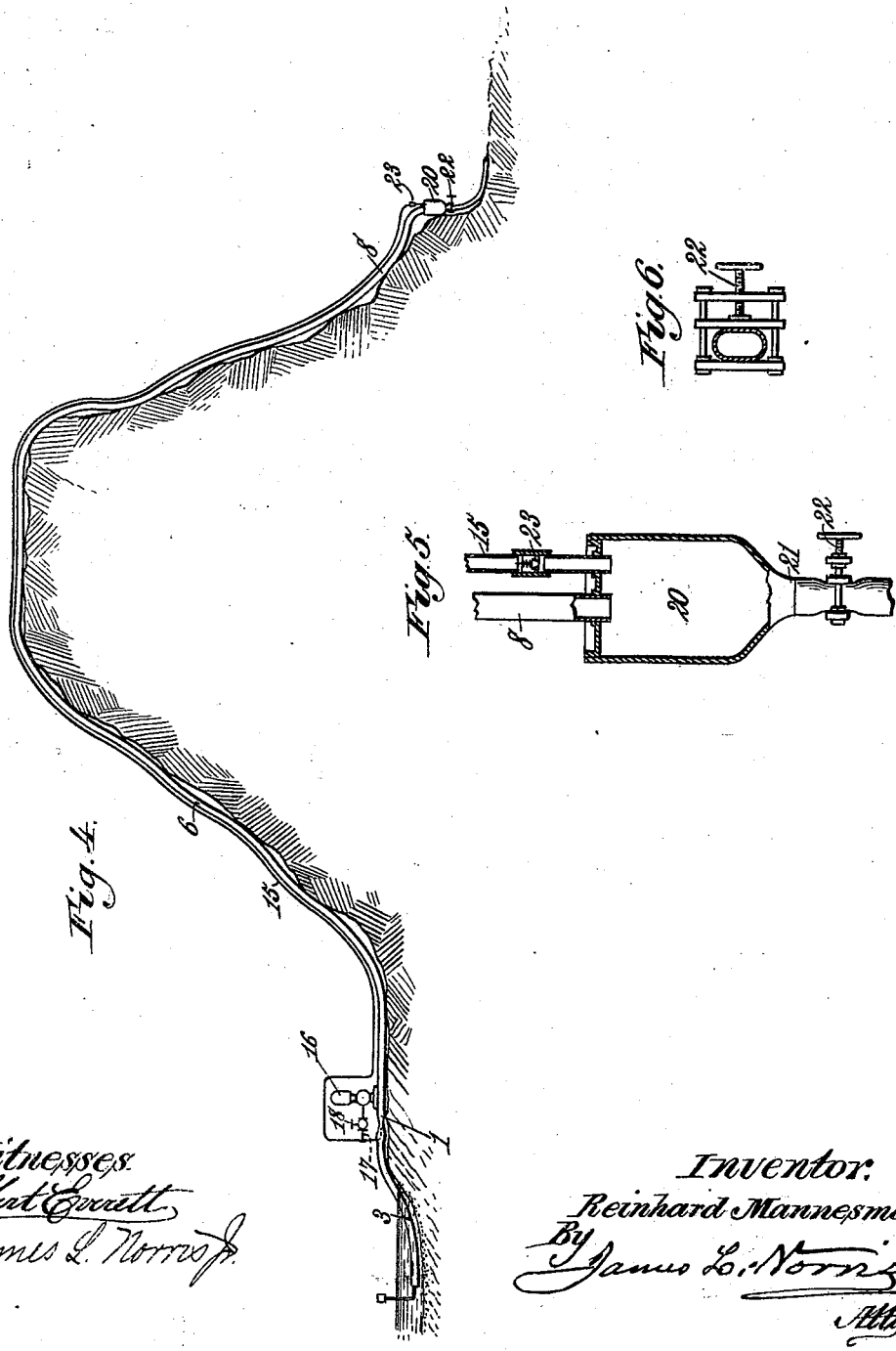

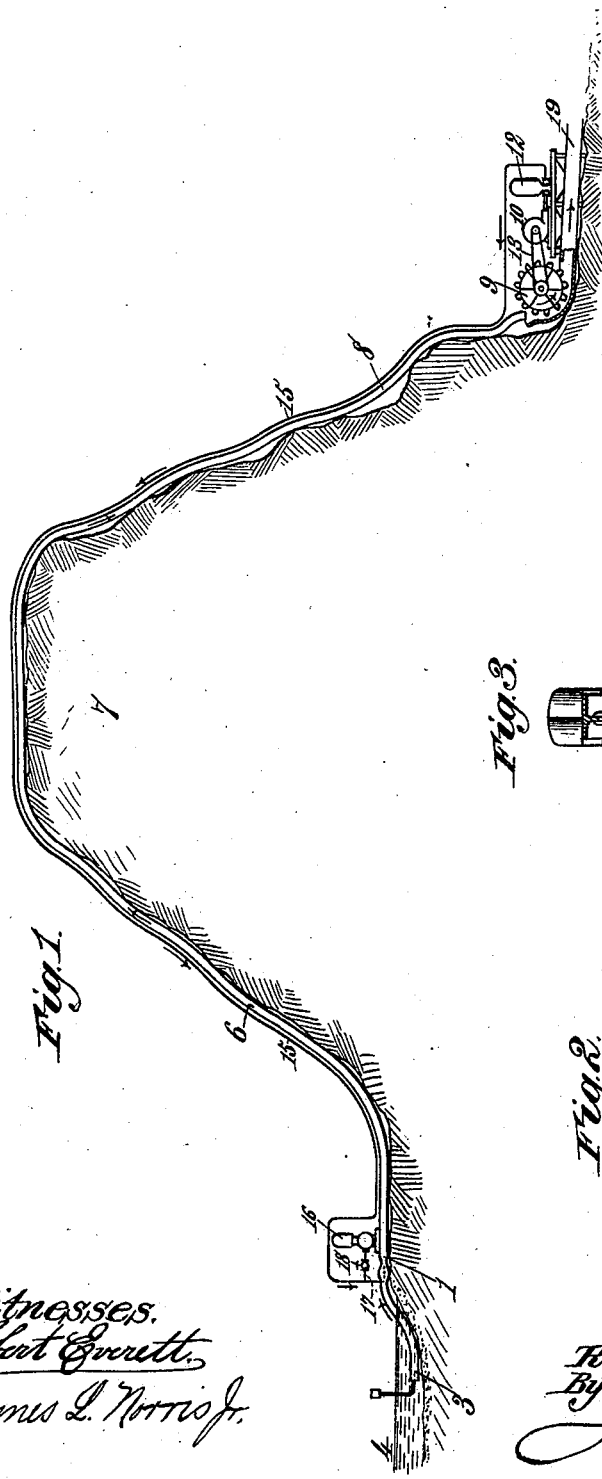

UNITED STATES PATENT OFFICE.

REINHARD MANNESMANN, OF NEW YORK, N. Y., ASSIGNOR TO THE MANNESMANN TUBE COMPANY, OF JERSEY CITY, NEW JERSEY.

METHOD OF AND APPARATUS FOR CONVEYING WATER.

SPECIFICATION forming part of Letters Patent No. 549,243, dated November 5, 1895.

Application filed January 19, 1895. Serial No. 535,537. (No model.)

*To all whom it may concern:*

Be it known that I, REINHARD MANNESMANN, a citizen of Germany, residing at New York, in the county of New York and State of New York, have invented new and useful Improvements in Methods of and Apparatus for Conveying Water, of which the following is a specification.

This invention has for its object to raise water to a greater height than is possible with suction-pumps and to provide a new and improved method of and means for conveying water over hills, mountains, and other elevations for supplying cities, towns, villages, factories, and other places with water for any desired purpose from lakes and other bodies of water which lie in such locations that the water cannot by ordinary contrivances be practicably utilized at distant points if it is required to be carried over hills or mountains.

The invention also has for its object to utilize the power of water traversing a conduit or pipe-line for compressing air, which is conducted to the starting-point of the conduit or pipe-line and caused to act upon the water for propelling the same from a lake or other supply through such conduit or pipe-line.

The invention also has for its object to convey water or other liquid from the isolated places over mountains or hills by the power of air under pressure delivered into a conduit or pipe-line by which the water or liquid is conducted.

To accomplish these objects, my invention involves the features, the principles of operation, the order of procedure, and the mechanical contrivances or devices hereinafter described, and pointed out in the claims, reference being made to the accompanying drawings, in which—

Figure 1 is a diagrammatical view sufficient to enable the principles of my invention to be understood by those skilled in the art. Fig. 2 is a detail sectional view of the starting end of the conduit or pipe-line, showing the compressed-air nozzle entering the same and connected with an auxiliary air-compressor or reservoir. Fig. 3 is a detail vertical sectional view of a Pelton water-wheel which is employed to operate an air compressing apparatus in juxtaposition to the delivery end of the conduit or pipe-line. Fig. 4 is a view similar to Fig. 1, showing a modification of the invention. Figs. 5 and 6 are detail views of parts hereinafter explained.

I will first briefly describe the apparatus illustrated in the drawings, which is typical of many contrivances adapted to be employed for carrying my invention into effect.

The numeral 1 indicates an injector or other suitable mechanical device or contrivance having an expanded chamber 2 and a water-inlet 3, connected with a lake or other body of water (indicated by the numeral 4.) The injector is also provided with a contracted outlet 5, communicating with a water conduit or pipe-line 6, which is designed to be carried over a hill, mountain, or other elevation, (indicated by the numeral 7,) and then to descend, as at 8, to a deep point considerably below the level of the water in the lake or other source of water-supply.

The lower end of the descending portion 8 of the conduit or pipe-line is so arranged as to deliver water to a suitable motor 9, which as here illustrated is in the form of a Pelton water-wheel arranged to be rotated in a vertical plane by the power of the water issuing from the delivery end of the conduit or pipe-line. The motor or water-wheel is designed to operate an air-compressing apparatus, (indicated by the numeral 10.) As here indicated the air-compressing apparatus is in the form of a rotary pump having an air-reservoir 12. The pump is operated by a belt connection 13 with the shaft of the motor or water-wheel 9.

The injector above described includes as an element the air-inlet nozzle 14, which connects by a pipe-line 15 with the air-reservoir 12 of the air-compressing apparatus 10. The nozzle 14 is also designed to be connected with an air pump or a reservoir 16, containing compressed air, so that at the beginning of the operation compressed air can be admitted into the injector for starting the system in operation, after which the entire operation is automatic, as will hereinafter appear.

The tube or pipe 17, which connects the nozzle 14 with the air-pump or air-reservoir or other container 16 for compressed air, is provided with a valve, as at 18, which will be closed when the desired air-pressure is obtained in the water conduit or pipe line 6.

For the purpose of conducting the water over a hill, mountain, or other elevation the water at the starting-point is placed in communication with the conduit or water pipe line 6 through the medium of the injector or other suitable mechanical contrivance and this conduit or pipe-line is carried over the highest point where the water is to be raised and from there is carried downward, as at 8, to the deepest point of the waterfall. The compressed air introduced at the beginning from the air pump or reservoir 16 into the injector or other mechanical contrivance causes the water from the lake or other source of supply to traverse the conduit or pipe-line 6 and to rise over the hill, mountain, or other elevation and descend through the descending portion 8 of the conduit or pipe-line. The descending water or liquid issuing from the delivery end of the conduit or pipe-line acts upon the motor or water-wheel 9 for the purpose of rotating the same, whereby the air-compressing apparatus is operated and air is compressed in the reservoir 12, from whence the compressed air is conducted by the pipe-line 15 to the injector-nozzle 14. The compressed air is mixed with the water or liquid and forces the same through the conduit or pipe-line 6 over the mountain or hill or other elevated point. The water or liquid flows down the descending portion 8 of the conduit or pipe-line and is delivered to the motor or water-wheel. The water or liquid, after being utilized to compress air by operating the motor or water-wheel and air-compressing apparatus, flows into a conduit 19, from whence it may be conducted to any point desired for any purpose whatever—as, for instance, for supplying a city, town, village, factory, or other place with water for power or other purposes.

After the column of water starts the motor or water-wheel into action the operation of the system will be automatic and continuous, because the water or liquid flowing down through the descending portion of the conduit or pipe-line 6 continuously actuates the motor or water-wheel, and the compressed air is conducted back to the starting-point, for the purpose of maintaining a continuous movement of water or liquid through the said conduit or pipe-line.

It will be observed that the water moving downward to the deepest point of the waterfall operates the air-compressing apparatus to compress air and can be subsequently utilized for power purposes. The air-pipe 15 conducts the compressed air to the starting-point and maintains a constant flow of water from the lake or other source of supply through the water conduit or pipe line 6 over the hill, mountain, or other elevation to the descending portion 8, from whence the water flows to the motor or water-wheel 9. The water passing to the outlet-conduit 19 can be used for supplying cities, towns, villages, factories, and other places with water for power or any other purpose for which it is desired to use water.

The essential feature of my invention resides in causing air under pressure to move or propel water from a water source or supply to the point desired, and, further, in utilizing the pressure or power of the descending water to compress air which is used to maintain a continuous movement of water in a conduit or pipe-line.

In the modification Figs. 4 and 5 the water or liquid delivered from the lower end of the water conduit or pipe line in caused to compress air in a chamber, from which chamber compressed air is carried back to the starting-point, as I will now explain in detail. The lower end of the descending portion 8 of the pipe-line communicates with an air and water separating chamber 20, having at its lower end a contracted discharge-outlet 21, provided with suitable means whereby the capacity of the outlet can be regulated to more or less retard the escape of air and secure the necessary air-pressure in the air-separating chamber, as will more fully hereinafter appear.

The device for regulating the capacity of the outlet may be of any construction suitable for the purpose required; but as here shown the outlet 21 is designed to be composed of an elastic tube having a suitable clamp actuated by a screw 22, so that by tightening up the screw it can be more or less compressed to control the flow of water therethrough.

The air-inlet nozzle 14 connects by the pipe-line 15 with the upper end of the air and water separating chamber 20, and in the said air-pipe, in juxtaposition to the chamber 20, is arranged a check-valve 23, having its valve seated by a spring adapted to be adjusted to a definite pressure to maintain approximately the same air-pressure in the air and water separating chamber. The nozzle 14 is also designed to be connected with an air pump or reservoir 16, containing compressed air, the same as described with reference to Fig. 1, so that at the beginning of the operation compressed air can be admitted into the injector for starting the system in operation, after which the entire operation is automatic, as will hereinafter appear.

The compressed air introduced from the air pump or reservoir 16 into the injector or other mechanical contrivance causes the water from the lake or other source of supply to traverse the conduit or pipe-line 6 and by it to rise over the hill, mountain, or other elevation through the descending portion 8 of the conduit or pipe-line. The descending water flows into the air and water separating chamber, and as its escape therefrom is retarded through the outlet 10 the water will rise in the chamber and compress air in the top portion thereof, which compressed air will flow back to the injector or other mechanical contrivance at the starting-point and act in the injector to continue the movement of the water through the conduit or pipe-line 6, whereupon the valve 18 can be closed for the purpose of cutting out the nozzle 13 from the air chamber or reservoir or other container 17 of compressed air. The operation of the system will now be automatic and continuous, because water flowing down through the descending portion 8 of the conduit or pipe-line constantly maintains air-pressure in the top portion of the chamber 9 and the compressed air travels back to the starting-point and maintains a continuous movement of water through the conduit or pipe-line. The water moving downward to the deepest point of the waterfall produces compressed air. The air-pipe 15 conducts the compressed air back to the starting-point and maintains a constant flow of water from the lake or other source of supply through the water conduit or pipe line 6 over the hill or mountain to the descending portion 8, from whence the water flows into the chamber 20. The water issuing from the outlet 21 can be used for supplying cities, towns, villages, factories, and other places with water for power purposes or for any other object that may be desired.

A simple method of compressing the air is to mix the air with the water as the latter descends through the descending portion of the water-conduit or pipe-line, whereby the air is compressed by the motion of the water. The air passing out from the chamber 9 through a relatively narrow or contracted point prevents air from passing back upward from this point, and therefore a certain pressure of air is maintained in the upper portion of the chamber 20, which forces the water to the contracted or narrow outlet 21. The compressed air, owing to its less specific weight, separates itself from the water in the chamber 20, and the separated compressed air flows back through the air-pipe line 15 to the injector or other contrivance for the purpose of forcing water through the water conduit or pipe line.

According to the depth which the water descends after passing over the hill, mountain, or elevation, the compression of air in the upper portion of the chamber 20 is more or less increased or decreased; but the pressure in chamber 20 is maintained at a regular pressure through the medium of the check-valve 23, which permits the air after it reaches a certain pressure to constantly flow back to the injector or other mechanical contrivance.

As before stated, the air-pipe 15 extends from the upper part of the chamber 20 back to the starting-point, and therefore conveys the compressed air from the top portion of the chamber 20 back over the hill, mountain, or other elevation to the starting-point of the water, where such air is mixed with fresh water and the latter caused to move through the water conduit or pipe line to the point where it is to be utilized for power or other purposes.

The compressed air introduced into the water at the starting-point and moving with the water over the hill, mountain, or other elevation diminishes the specific weight of the water column, and thereby renders it possible to materially diminish the thickness of the shells of the pipes in the horizontal and ascending portions thereof. By this means the weight of the pipe-line and the expense of manufacturing the same are materially reduced. The mixing of compressed air with water for moving the latter enables great speed or velocity of the water to be attained in the pipes, thereby rendering it possible to materially diminish the diameter of the pipes for a given amount of water, chiefly because the friction is reduced. By rendering it possible to reduce the diameter of the pipes the expense of introducing the system is largely reduced.

After the automatic operation of the system commences, as hereinbefore explained, the compressed air makes a continuous circuit through the water conduit or pipe line to the chamber 20 and back to the water conduit or pipe line at the starting-point, and to a great extent the same compressed air is used over and over again; but, if necessary, a small quantity of atmospheric air can be added to compensate for the air dissolved by the water or escaping from the chamber 20 by not being entirely separated from the water. The atmospheric air referred to can be introduced through the medium of an air-pipe 24, having any suitable automatic valve. If the separation of the air and water is perfect and the pipes are air-tight, it will not, under ordinary conditions, be necessary to admit atmospheric air as above stated, and practically the same air makes the circuit over and over again, such air acting as a water carrier or conveyer from the starting-point over the hill, mountain, or elevation to the deepest point of the waterfall. At the same time the compressed air diminishes the specific weight of the uphill water column and forces this column over the hill, mountain, or elevation.

The check-valve 23 allows the air to escape from chamber 20 only when such air possesses the required pressure, thereby maintaining in the air-chamber an approximately uniform air-pressure.

I may substitute an open ditch or other water-way for any horizontal portion of the water conduit or pipe line. This open ditch or water-way will extend a certain distance horizontally and then deliver the water into a pipe, which may conduct it to another approximately horizontal open ditch or water-way.

In the modification Fig. 4 I propose to permit the compressed air to escape—say at a point $a$—and cause the descending column of water to draw in air—say at the point $b$—so that such air thus drawn in can be compressed in the chamber 20 and be carried back to the injector for use in moving the water through the horizontal and ascending portions of the water conduit or pipe line. The plan which I prefer, however, is that substantially illustrated in Fig. 1 of the drawings.

I do not wish to be understood as confining myself to any particular arrangement of parts for carrying my invention into effect, as the apparatus or mechanical contrivances can be variously modified without altering the spirit of the invention.

As shown, the pipe-line 15 for carrying the air to the starting-point is reduced in diameter and the air is allowed to go at a high speed, in order to reduce the cost of the air-pipe line.

It is advisable to provide means introducing the relatively high compressed air into the water to be moved uphill in a way that utilizes the energy of the compressed air in expanding. This may be accomplished by the injector shown.

In Fig. 1 I have illustrated an auxiliary air pump or reservoir 16 for the purpose of introducing compressed air at the beginning of the operation; but obviously this air pump or reservoir can be omitted and the air-compressing apparatus 10 operated in any suitable manner to start the system into operation, after which the action is automatic, as will be clearly understood from the foregoing explanations.

What I claim as my invention is—

1. The method herein described, of conveying liquid from a source or supply over a hill or mountain to a distant point or station, which consists in causing air under pressure to raise a column of liquid over the hill or mountain, utilizing the power of the descending liquid to compress air, and conveying such compressed air to the starting point and causing it to continue the movement of the liquid over the hill or mountain, substantially as set forth.

2. The method herein described, of conveying liquid from a source or supply over a hill or mountain to a distant point or station, which consists in causing air under pressure to raise a column of liquid over the hill or mountain, utilizing the power or pressure of the descending liquid to compress air, conducting the descending liquid to a point for power, or other purpose, and conveying the compressed air to the starting point, and causing it to continue the movement of the liquid over the hill or mountain, substantially as set forth.

3. The method herein described, of conveying liquid from a source or supply to a distant point or station, which consists in causing a column of liquid descending through a conduit to compress atmospheric air, conducting a part or all of such air to the starting point of the conduit, and causing the compressed air to move the liquid therethrough, substantially as set forth.

4. The combination in a water conveying system, of a liquid or water conduit following an ascending and descending course, a device communicating with a source or supply, and connected with the said conduit, means for compressing air by the action of the descending column of liquid or water, and an air pipe line for conveying the compressed air to the device for continuing the movement of the liquid or water through the ascending part of said conduit, substantially as set forth.

In testimony whereof I have hereunto set my hand in presence of two subscribing witnesses.

REINHARD MANNESMANN.

Witnesses:
EMIL KIPPER,
H. SCHOMBURG.